United States Patent [19]

Alaria et al.

[11] Patent Number: 4,573,074

[45] Date of Patent: Feb. 25, 1986

[54] CODING AND DECODING METHOD AND SYSTEM FOR VARIABLE-LENGTH SEQUENCES OF DIGITAL DATA

[75] Inventors: Gian B. Alaria; Paolo Destefanis; Cesare Poggio, all of Turin, Italy

[73] Assignee: CSELT Centro Studi e Laboratori Telecomunicazioni S.p.A., Turin, Italy

[21] Appl. No.: 559,917

[22] Filed: Dec. 9, 1983

[30] Foreign Application Priority Data

Dec. 9, 1982 [IT] Italy .............................. 68439 A/82

[51] Int. Cl.$^4$ .............................................. H04N 7/12
[52] U.S. Cl. .................................... 358/136; 358/133
[58] Field of Search ............... 358/136, 133, 135, 138, 358/260, 261; 340/347 DD; 382/56

[56] References Cited

U.S. PATENT DOCUMENTS 4,117,517  9/1978  Shintani et al. ...................... 358/260
4,276,544  6/1981  Iinuma ........................... 358/133 X
4,398,217  8/1983  Peters .................................. 358/138

OTHER PUBLICATIONS

Article "Elaboratore in Tempo Reale Per La Riduzione Di Ridondanza Del Segnale Video Standard CCIR", by S. Brofferio et al., published Elettronica E Telecomunicazioni, No. 5, 1978.
"Image Coding by Linear Transformation . . . ", by Ali Habibi et al., IEEE Transactions and Communications Technology, vol. Com. 19, No. 1, Feb. 71.
"Encoding of a Counting Rate Source with Orthogonal Functions", by Algazi et al., Symposium on Computer Processing, Apr. 8-9, 1969, IEEE Transactions on Communications, Jul. 1975, pp. 785, 786.
"Hadamard Transform Image Coding", by W. K. Pratt et al., Proceedings of the IEEE, vol. 57, No. Jan. 1969.
"Adaptive Transform Image for Human Analysis", by Mitchell et al., Published in CH1435-7/79/00-00-0119900.75/1979, IEEE.
"Adaptive Coding of Monochrome and Color Images", by Wen-Hsiung Chen et al., IEEE Transactions and Communications, vol. Com 25, No. 11, Nov. 1977.

Primary Examiner—Howard W. Britton
Assistant Examiner—Victor R. Kostak
Attorney, Agent, or Firm—Karl F. Ross; Herbert Dubno

[57] ABSTRACT

Television signals generated at a transmitting station are digitized and are then transformed into bit groups by a precoder reducing their information content by eliminating redundancies, as by comparing each pixel of a given frame with the homologous pixel of the immediately preceding frame and, upon detecting their equality, emitting a particular reduction code in lieu of an otherwise emitted luminance signal. A message encoder following the precoder generates outgoing data words which may comprise a luminance value accompanied by an integrity code, a changeover signal accompanied by a reduction code, a numerical value specifying the number of consecutive pixels remaining unchanged from the preceding frame, or a synchronizing code. The bits of the outgoing data words are serialized and are temporarily stored in a buffer register in order to be sent at regular intervals, via a communication channel, to a receiving station where a message decoder regroups them in their original order. The decoder separates the luminance data from the reduction codes under the control of a local clock, re-expands the reduced information and, after checking for transmission errors, converts the received data into luminosity signals designed to reproduce the original television picture.

4 Claims, 5 Drawing Figures

CODING AND DECODING METHOD AND SYSTEM FOR VARIABLE-LENGTH SEQUENCES OF DIGITAL DATA

FIELD OF THE INVENTION

Our present invention relates to a method of and a system for coding and decoding variable-length sequences of digital data, with suppression of redundancies at a transmitting station and substantial restoration of these redundancies at a receiving station which is linked with that transmitting station by a communication channel whose data-handling capacity determines the degree of suppression required.

BACKGROUND OF THE INVENTION

The classical way of transmitting the contents of orthogonally scannable data arrays such as television images is to sample them line by line with pulse-code modulation (PCM) and reorganize the serially arriving PCM samples into a recurrent frame at the receiving end. Numerous attempts have been made to lower the bit rate required for such transmission, in order not to exceed the maximum operating rate of the channel employed, without sacrificing significant details in the visual representation. Various transcoding techniques designed to reduce the number of bits include linear transformations of the Fourier, Hadamard and other types described, for example, in an article titled *Hadamard Transform Image Coding* by William K. Pratt, Julius Kane and Harry C. Andrews, Proceedings of the IEEE, Vol. 57, No. 1, January 1969, pages 58–65, and an article titled *Image Coding by Linear Transformation and Block Quantization* by Ali Habibi and Paul A. Wintz, IEEE Transactions on Communication Technology, Vol. Com-19, No. 1, February 1971, pages 50–63.

By subdividing each array or frame into a multiplicity of elemental data blocks, generally of rectangular shape, it is possible to allocate different numbers of bits to the several blocks in accordance with their relative degrees of activity in terms of signal energy. Reference in this connection may be made to such publications as an article titled *Use of "Activity" Classes in Adaptive Transform Image Coding* by James I. Gimlett, IEEE Transactions on Communications, July 1975, pages 785 and 786; an article titled *Adaptive Coding of Monochrome and Color Images* by Wen-Hsium Chen and C. Harrison Smith, IEEE Transactions on Communications, Vol. Com.-25, No. 11, November 1977, pages 1285–1292; and an article titled *"Adaptive Transform Image Coding for Human Analysis"* by O. R. Mitchell and Ali Tabatabai, ICC 1979, Boston, pages 23.2.1–23.2.5. Reference may further be made to an article by S. Brofferio et al in the Italian magazine "Electronica e Telecommunicazioni", Vol. No. 5, 1978, pages 195–208.

According to commonly owned U.S. patent application Ser. No. 515,362, filed 19 July 1983 by Leonardo Chiariglione and Mario Guglielmo, a two-dimensional data array such as an orthogonally scanned television image is divided into a multiplicity of elemental blocks each containing a given number of PCM samples which are converted by linear transformation into a series of coefficients to be quantized for transmission to a remote receiver. The data blocks are processed one at a time by an iterative coder which allots a progressively increasing number of bits to a given block in successive operating stages, the bits being allocated to the several coefficients of the block according to the position of the barycenter of their signal energy assigning the block to one of several classes. An initial overall reconstruction error, computed from the coefficients of a block with no bits yet available for quantization, is updated with each bit allotment in the course of an iteration in which a selected coefficient is subjected to simultaneous coding with a number of quantizers differing from one another in their quantum steps. The coding operations of the concurrently active quantizers have different error-reducing effects and the resulting minimum error is compared with a threshold which itself may be variable according to the activity of the image block being processed. When the residual overall error falls below that threshold, processing is terminated and the bits used in the coding of each coefficient are sequentially sent out together with a count of the total number of bits allotted to the block and a parameter indicating its classification, this information enabling the receiver to reconstruct the image within the limits of the tolerated residual error.

Another known redundancy-reducing method calls for comparing all picture elements or image points on a scanning line of a current image frame, referred to in the art as pixels, with homologously positioned pixels of the immediately preceding frame and generating a reduction code for any number of consecutive pixels which are found to have substantially the same luminance as their homologs in the preceding frame. Digital signals so coded at the transmitting station are then sent to the receiving station for decoding by a reverse procedure so as substantially to reconstruct the original message signals.

The coders and decorders used at the two stations generally comprise microprogrammed or wired logic circuits particularly designed for the purpose at hand. Since the encoded data words constitute messages of variable length, depending for example on the number of consecutive pixels whose luminance values are not being sent out inasmuch as they substantially equal those of respective earlier homologs, the outgoing bits must also be stored for varying times at the transmitting station in order to be sent at regular intervals over the channel. Preliminary storage is also required at the receiving station in order to provide time for the re-expansion of the incoming data words and for integration of the reconstructed message signals into a uniform data flow used, for example, to control the beam of a monitoring video tube.

The re-expansion of the received information may also lead to the amplification of transmission errors introduced by the digital channel. These errors may require a "stuffing" of the resulting data flow, according to an expedient widely practiced in the reproduction of video images, with signals replicating a preceding frame so as to hold the displayed image stationary for a limited period.

OBJECTS OF THE INVENTION

An object of our present invention is to provide a method of and means for enhancing the flexibility of coding and decoding equipment at two intercommunicating stations in a system of the type discussed, thereby adapting that equipment for use with different modes of operation such as the various techniques of redundancy elimination referred to above which in some instances might be interchangeably used in the same system.

More particularly, our invention aims at simplifying the coding and decoding of digitized video signals with a bit-rate reduction resulting from the suppression of luminance values for pixels substantially identical with their homologs in a preceding frame.

SUMMARY OF THE INVENTION

Thus, our invention provides both a method and a system for conveying a sequence of original message signals from a transmitting station over a communication channel of limited data-handling capacity to a receiving station in the form of digital data words of reduced information content. The method comprises as a first step the encoding of the original message signals at the transmitting station into a plurality of different types of bit groups or data words with at least partial elimination of redundancies by one or more of the techniques referred to, i.e. a first type representing message signals (PCM samples) to be conveyed in a magnitude-indicating mode, a second type constituting a qualitative code which represents an information-reducing mode of conveyance eliminating a number of signal cycles in the original sequence, a third type constituting a quantitative code which represents a count of the number of signal cycles so eliminated, and a fourth type representing recurrent synchronization signals. In a second step, the bits of a predetermined number of such groups are accumulated at the transmitting station prior to being sent at regular intervals over the channel in a third step. The bits arriving at the receiving station are temporarily stored there, in a fourth step, and are subsequently reoriented in a fifth step in groups corresponding to those of the first step, with decoding of the groups and separation of the different types from one another. A sixth and final step reconstitutes the sequence of original message signals, with re-expansion of the information contained in the groups of the first, second and third types, under the control of locally generated timing signals which are correlated with the synchronization signals represented by bit groups of the fourth type.

We also prefer to provide bit groups of a fifth type generated at the transmitting station for indicating a changeover from one mode of conveyance to another, such as a switch from bit groups of the first type—accompanied by an integrity code—to a bit group of the second type indicating a particular mode of reduction.

The term "luminance value" may represent either an absolute magnitude of a given pixel or the difference between this magnitude and that of its earlier homolog, preferably the latter.

In structural terms, a system according to our invention comprises coding means at the transmitting station connected to a source of original message signals, such as a video camera, for at least partially eliminating redundancies by converting only some of these message signals into respective bit groups of the aforementioned first type and replacing redundancy-containing groupings of other message signals by single bit groups of the second type, with generation for each bit group of the latter type a bit group of the third type and periodic addition of a recurrent bit group of the fourth type. The accumulation of the bits of these groups—pursuant to the second step of our method—is performed by first storage means connected to the coding means at the transmitting station and followed by interface means responsive to the presence of a predetermined number of groups in the first storage means serially emitting their bits over the communication channel to the receiving station, thereby carrying out the third method step. The fourth step, i.e. the temporary storage of the bits arriving at the receiving station, is performed by second storage means working into the decoding means for orienting these bits with re-expansion of the contained information in conformity with the last two steps, the operation of the decoding means being controlled by timing means correlating the locally generated clock pulses with the recurrent synchronization signals.

The receiving station, advantageously, also includes circuitry for detection of possible transmission errors, e.g. by means of a serializer to which the regrouped incoming bits are fed in parallel from the second storage means and which distributes them in mutually staggered relationship over several signal paths to facilitate a checking for accuracy by verifying the presence of predetermined bit combinations in certain groups.

BRIEF DESCRIPTION OF THE INVENTION

The above and other features of our invention will now be described in detail with reference to the accompanying drawing in which.

SPECIFIC DESCRIPTION

Figure 1:
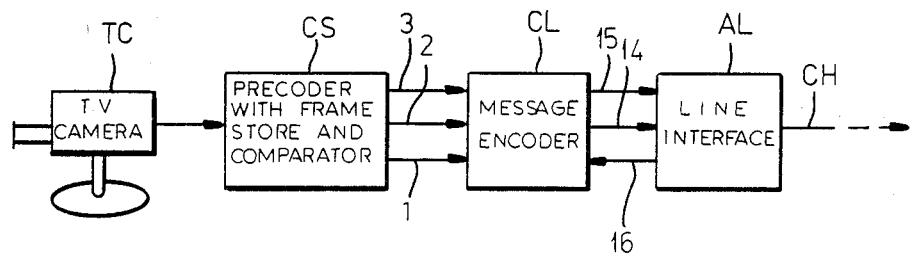
FIG. 1 is a block diagram of a transmitting station forming part of a communication system to which our invention is applicable.

In FIG. 1 we have diagrammatically illustrated a transmitting station wherein a video camera TC generates a sequence of message signals of analog type corresponding to the luminance of pixels scanned in a recurrent line and frame sweep, these message signals being accompanied by the usual line- and frame-synchronizing signals. A precoder CS is connected to the output of camera TC and stores the digitized image signals for at least one frame period to enable a comparison of the luminance of a newly scanned image point with that of a homologously positioned point as scanned in the preceding frame. When the comparison shows a disparity between these values, a PCM sample representing the relative luminance is transmitted via a line 1—here designed as a 4-wire multiple—to a message encoder CL. If the two luminance values compared with each other are substantially identical, a binary reduction code is delivered to encoder CL on a line 2; the latter is advantageously designed as a 3-wire multiple in order to accommodate a variety of reduction codes enabling the utilization of different modes of redundancy suppression. Digitized synchronization signals, differing in duration for line and frame flyback, are fed from precoder CS to encoder CL on a line 3.

Conventional precoders of the kind here considered are programmable to maintain a steady average data stream by limiting the extent of information reduction and even reintroducing redundancies, if necessary.

Message encoder CL, more fully described hereinafter with reference to FIG. 2, generates 8-bit words or bytes whose bits are supplied in parallel to a line interface AL on a wire multiple 14. A lead 15 extending from encoder CL to interface AL informs the latter by a data-ready signal that a predetermined number of bytes—four in this specific instance—are available for transmission over a communication channel CH to a receiving station illustrated in FIG. 3; when interface AL has accepted these data, it sends an acknowledgment signal to the encoder on a lead 16. Channel CH may be a radio link or a cable.

Interface AL, designed to convert the received bits from parallel to serial form, includes a buffer memory of sufficient capacity to store enough bytes, arriving four at a time at irregular intervals, to transfer these bytes in periodically recurring time slots to channel CH in order to maintain continuity of message transmission. The serialization takes place with the aid of a shift register in the interface which is periodically loaded with the data stored in the buffer memory and read out at the transmission rate of the channel, e.g. in interleaved relationship with bytes from other stations according to conventional TDM (time-division multiplexing) practice.

Figure 2:
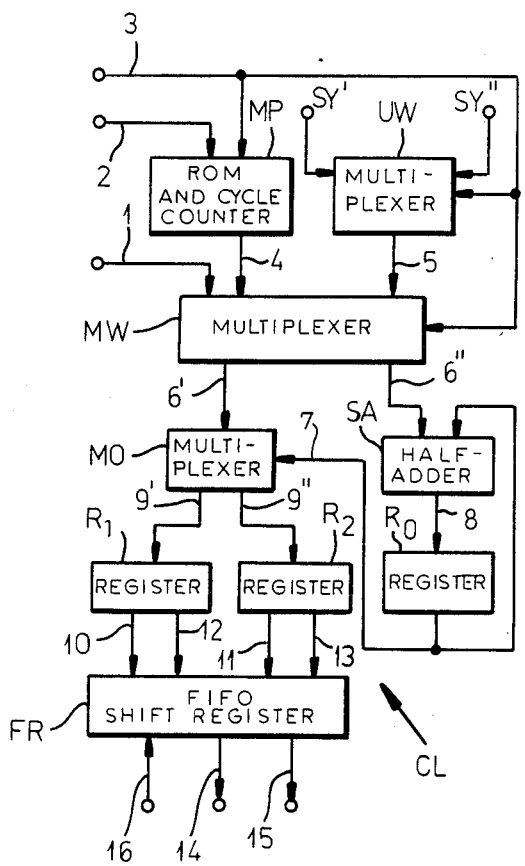
FIG. 2 shows details of a message encoder according to our invention, included in the transmitting station of FIG. 1.

Reference will now be made to FIG. 2 showing details of the message encoder CL. The latter comprises two cascaded multiplexers UW and MW which are switchable by the synchronizing signals periodically appearing on incoming line 3 having five wires. Line 2 as well as two of the wires of line 3 extend to a unit MP which includes a read-only memory (ROM) of the stored-microprogram type as well as a cycle counter, this counter being stepped by pulses from a local clock (not shown) which controls the scanner of camera TC. Each clock pulse coincides with the scanning of an image point, allowing the cycle counter to register the number of consecutive pixels for which no luminance code is being generated as concurrently indicated by a reduction code appearing on line 2; this reduction code may be accompanied by an all-zero bit group on the four wires of line 1. These four wires, as well as an output multiple 4 of unit MP, are connected to respective inputs of multiplexer MW which has further inputs tied to an output multiple 5 of multiplexer UW.

Eight of the wires of line 4 are connected to respective stage outputs of the cycle counter in memory unit MP in order to carry up to 256 numerical values representing the number of consecutive image points or pixels for which no luminance code appears on line 1. Other wires of multiple 4 carry either the reduction code appearing on incoming line 2 in the absence of brightness variations, an integrity code present on that line when a true luminance code arrives on line 1, or a changeover code read out from the ROM in response to a switch in the mode of operation of precoder CS (FIG. 1) from integrity to reduction or vice versa. A switchover to the reduction mode starts the cycle counter in unit MP which is cleared upon a return to the integrity mode.

Multiplexer UW, with two control inputs connected to respective wires of line 3, has two data inputs connected to fixed signal sources SY' and SY'' supplying respective bit combinations distinct from each other. The presence of the synchronizing signal switches the multiplexer MW, whose control input is tied to the fifth wire of line 3, from lines 1 and 4 to the output line 5 of multiplexer UW which by that signal is successively connected to these two sources for respective time periods varying with the character of the signal. In its alternate position, therefore, multiplexer MW receives two consecutive codes each listing a number of clock cycles depending on whether the signal pertains to line or to frame alignment.

Multiplexer MW has a 20-wire output multiple 6' divided into four submultiples of five wires each, designed to carry respective 4-bit groups—termed items of elementary information—and accompanying gating bits. Four wires of the first submultiple are normally connected to those of line 1, carrying the luminance bits. Four wires of the second submultiple receive, in the normal position of multiplexer MW, from respective wires of multiple 4 integrity or reduction codes (with their three bits supplemented by a verification bit from the ROM) or a changeover code directly generated by the ROM. Eight wires of the two remaining submultiples are normally tied to the wires of multiple 4 originating at the cycle counter. In the alternate position of this multiplexer, eight wires of the first two submultiples are connected to multiple 5 to receive the data words emitted by sources SY' and SY''.

Another output line 6'' of multiplexer MW is permanently connected to the ROM of unit MP by which it is pulsed whenever a new item of information is presented to that multiplexer, i.e. in any cycle in which unit MP receives an integrity code or a first of a series of reduction codes on line 2, generates a changeover code, or is addressed by a synchronizing signal on line 3. Line 6'' extends to a half-adder or summing circuit SA and has three wires which are respectively energized when no item, one item or two items are to be fed to multiplexer MW in a given cycle. A two-item situation exists in several instances, as where (a) an integrity code on line 2 is accompanied by a luminance code on line 1, (b) the contents of the cycle counter of memory unit MP are read on eight wires, (c) a code word from source SY' and SY'' is extracted via multiple 5, or (d) a changeover code is generated by the ROM together with a supplemental code indicating that the next word will be a cycle count. Two successive one-item situations occur when first a changeover code and then an associated reduction code appear in respective cycles; a no-item situation marks the interval during which the cycle counter is operating to register the number of image points for which no luminance code is being emitted.

Half-adder SA works via a 3-wire multiple 8 into a register $R_0$ whose 3-wire output line 7 transmits its contents to the half-adder and to a switching input of another multiplexer MO connected to line multiple 6'. The fifth wires of the four submultiples of multiple 6' are selectively energized by the ROM, via respective wires of multiple 4 normally connected thereto, in order to control a gating circuit in the input of multiplexer MO for always unblocking only those four or eight wires of multiple 6' that during a given cycle carry the item or items of information to be read out. The binary signal on line 7 progressively advances the multiplexer MO, in accordance with the number (0, 1 or 2) of these items, to connect the unblocked information-carrying wires of multiple 6' to respective 4-lead output lines of this multiplexer which are divided among two 16-lead multiples 9' and 9'' extending to respective registers $R_1$ and $R_2$. Half-adder SA, operating without carry, returns to zero after every eight steps.

Register $R_1$ has a 16-lead output line 10 extending to respective stages of a shift register FR of the FIFO (first in, first out) type which receives the contents of register $R_1$ when the latter, being fully loaded, sends a write-enabling command to register FR on a lead 12. Similarly, the complete loading of register $R_2$ causes the transfer of its contents via a 16-lead multiple 11 to another group of stages of register FR in response to a write-enabling command emitted by register $R_2$ on a lead 13. Such a transfer makes the interim registers $R_1$ and $R_2$ available for the storage of new words, i.e. two bytes each. FIFO register FR, when loaded, sends the aforementioned data-ready signal on lead 15 to line interface AL (FIG. 1) and unloads itself by way of multiple 14, reading out the eight items of information encompassed by the four bytes in the order in which they have been entered. Register FR is cleared by the acknowledgment signal arriving back from interface AL over lead 16.

Let us assume, for example, that a part of the message to be conveyed via channel CH concerns a succession of 15 image points in a scanning line of which the first five have pixels whose luminances differ significantly from those of their homologous predecessors while the remaining 10 are of substantially unchanged brightness. During each of the first five cycles, therefore, precoder CS will generate a luminance code on line 1 and an accompanying integrity code on line 3. If the contents of register $R_0$ have the numerical value 0 in the first one of these cycles, multiplexers MW and MO transmit the luminance and integrity codes from lines 1 and 4 by way of multiple 6' to the first and second 4-lead output groups of multiple 9' for entry into the first eight stages of register $R_1$ as a byte headed by the integrity code. This process is repeated in the second cycle during which, however, multiplexer MO has shifted to its third and fourth output groups in response to a signal on line 7 indicating that two items of information have already been registered. The new luminance code and the accompanying integrity code are therefore stored in the last eight stages of the 16-stage register $R_1$. Similarly, the 16 stages of register $R_2$ are loaded during the next two cycles with the third and fourth code pairs whereupon the fifth code pair is written in the first half of register $R_1$ which has been cleared in the interim.

At this point the precoder CS informs unit MP, by a reduction code or equality signal on line 2, that the next pixel is unchanged with reference to its homologous predecessor. The ROM of unit MP thereupon sends out the changeover code on four of the wires of multiple 4, causing it to be fed by the cascaded multiplexers MW and MO via the third output group of multiple 9' to stages Nos. 9–12 of register $R_1$. With multiplexer MO taking one step under the control of half-adder SA and register $R_0$, the immediately following reduction code is entered in the last four stages of register $R_1$.

As long as reduction codes continue to arrive, i.e. during the next nine cycles, the contents of register $R_0$ and thus the position of multiplexer MO do not change. When the cycle counter in unit MP reaches a count of 10, a switch back to luminance transmission occurs as detected by the ROM in response to an integrity code again appearing on line 3. The ROM now generates the corresponding changeover code which makes use of eight wires of multiples 4, 6' and 9" so as to be written in the first eight stages of register $R_2$. There follows the word giving the final reading of the cycle counter which similarly occupies the last eight stages of register $R_2$.

Whenever a synchronizing signal appears on line 3, multiplexer MW is switched into its alternate position and successively sends the two code words from sources SY' and SY" to multiplexer MO in cascade therewith. Depending on the number of cycles during which each of these code words is in existence, the 8-stage counter constituted by half-adder SA and register $R_0$ takes one or more steps to let multiplexer MO enter these code words in available 8-stage sections of registers $R_1$ and $R_2$ for subsequent transfer to register FR and readout to line interface AL. The described components, of course, operate with the delays necessary to insure an orderly transfer of all items of information.

If a series of pixels of unchanged brightness (with reference to their preceding homologs) encompasses more than 256 clock cycles, the resetting of the cycle counter after its $256^{th}$ step causes the ROM in unit MP to generate another changeover code, followed by the emission of a reduction code on multiple 4, to start a new count. Such a resetting and restart also occurs when the cycle count is interrupted by a synchronizing signal at the end of a line.

Figure 3:
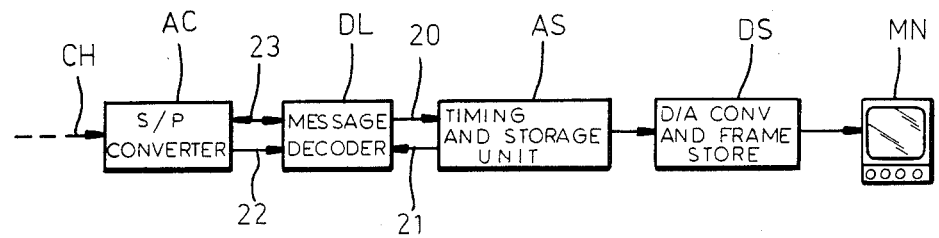
FIG. 3 is a block diagram of a receiving station associated with the transmitting station of FIG. 1.

In FIG. 3 we have shown the associated receiving station as comprising a series/parallel converter AC to which the incoming bits are fed by channel CH. This converter includes a shift register, a comparator designed to recognize arriving byte combinations pertaining to line or frame synchronism (with allowance made for possible bit errors in transmission) and a buffer memory into which the bits are loaded in parallel under the control of this comparator so that the bytes of a frame occupy sections individually assigned to respective lines thereof. Converter AC communicates with a message decoder DL, more fully described hereinafter with reference to FIG. 4, via a line multiple 22 of 32 wires and a two-way connection 23. Decoder DL extracts the luminance values, reduction codes and synchronizing signals from the data supplied to it via multiple 22 and re-expands the extracted information by a procedure which is the converse of that used in the precoder CS of FIG. 1. The expanded data are sent on a line 20 to a storage unit AS after being correlated with a local timer in that unit sending frame-sync and line-sync signals to the decoder on a connection 21. Unit AS has a storage capacity accommodating all the data of a scanning line whereby, if the decoder detects an error pertaining to such a line, its data may be replaced by a repetition of the pixels from the corresponding line of the preceding frame.

--Reduction codes followed by data words indicative of a number of consecutive cycles during which no luminance code was generated, as described above, are reiterated in the expansion process a number of times corresponding to the cycle count whereby a continuous flow of such words is generated in the rhythm of the local clock. This flow is fed to a digital/analog converter DS which includes means for storing the luminance codes of a preceding frame in order to substitute them for the reduction codes appearing in homologous time positions within that data flow. Since the new luminance codes represent only the variations in brightness with reference to their preceding homologs, converter DS also uses the previously stored samples to generate for each pixel an analog signal representing absolute brightness. These analog signals are supplied to a television tube MN for display on a monitoring screen thereof.

Figure 4:
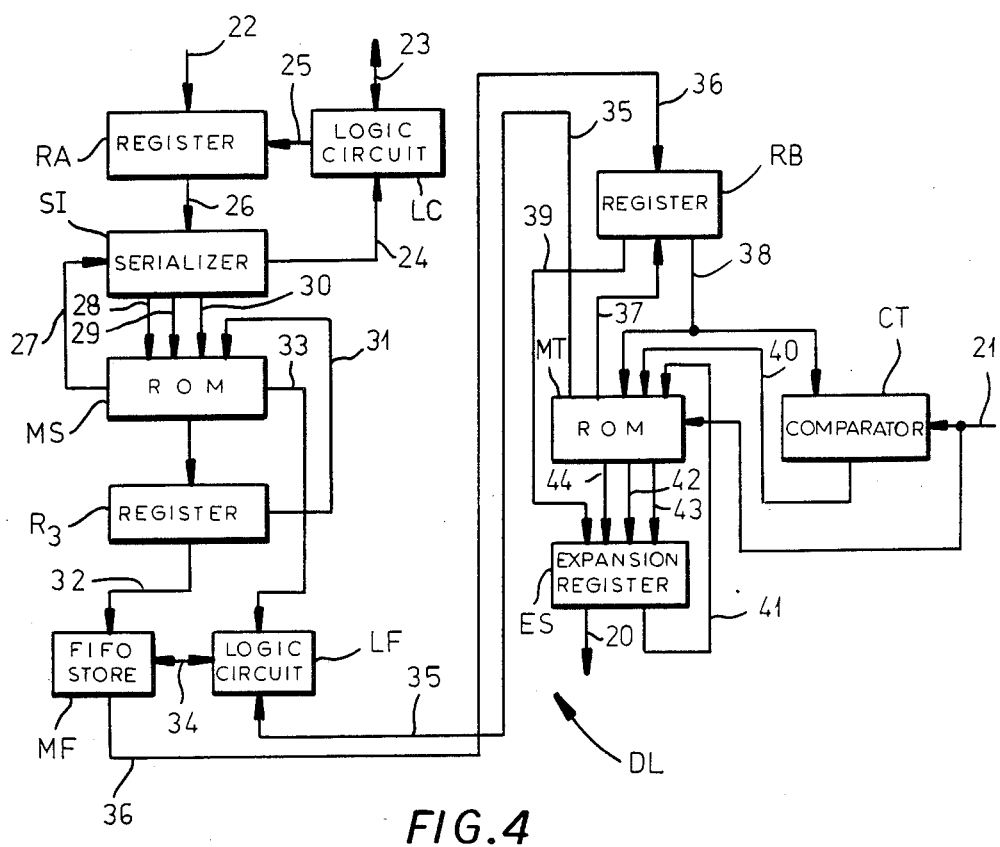
FIG. 4 shows details of a decoder included in the receiving station of FIG. 3.

As illustrated in FIG. 4, decoder DL comprises an input register RA to which the 32-wire output multiple 22 of converter AC is connected. A logic circuit LC dialogues with that converter via the two-way connection 23 and has an output lead 25 extending to register RA. A 32-wire output multiple 26 links the register RA with a serializer SI from which a lead 24 extends to logic circuit LC. Serializer SI, whose structure will be described with reference to FIG. 5, energizes its output lead 24 whenever it is ready to receive new data from register RA. The request for new data is forwarded by circuit LC through connection 23 to converter AC (FIG. 3) which thereupon reads out the bits of four bytes—encompassing eight items of elementary information—on the wires of multiple 22 and sends out a follow-up signal on connection 23; circuit LC then enables the register RA, by a signal on lead 25, to load these bits.

Figure 5:
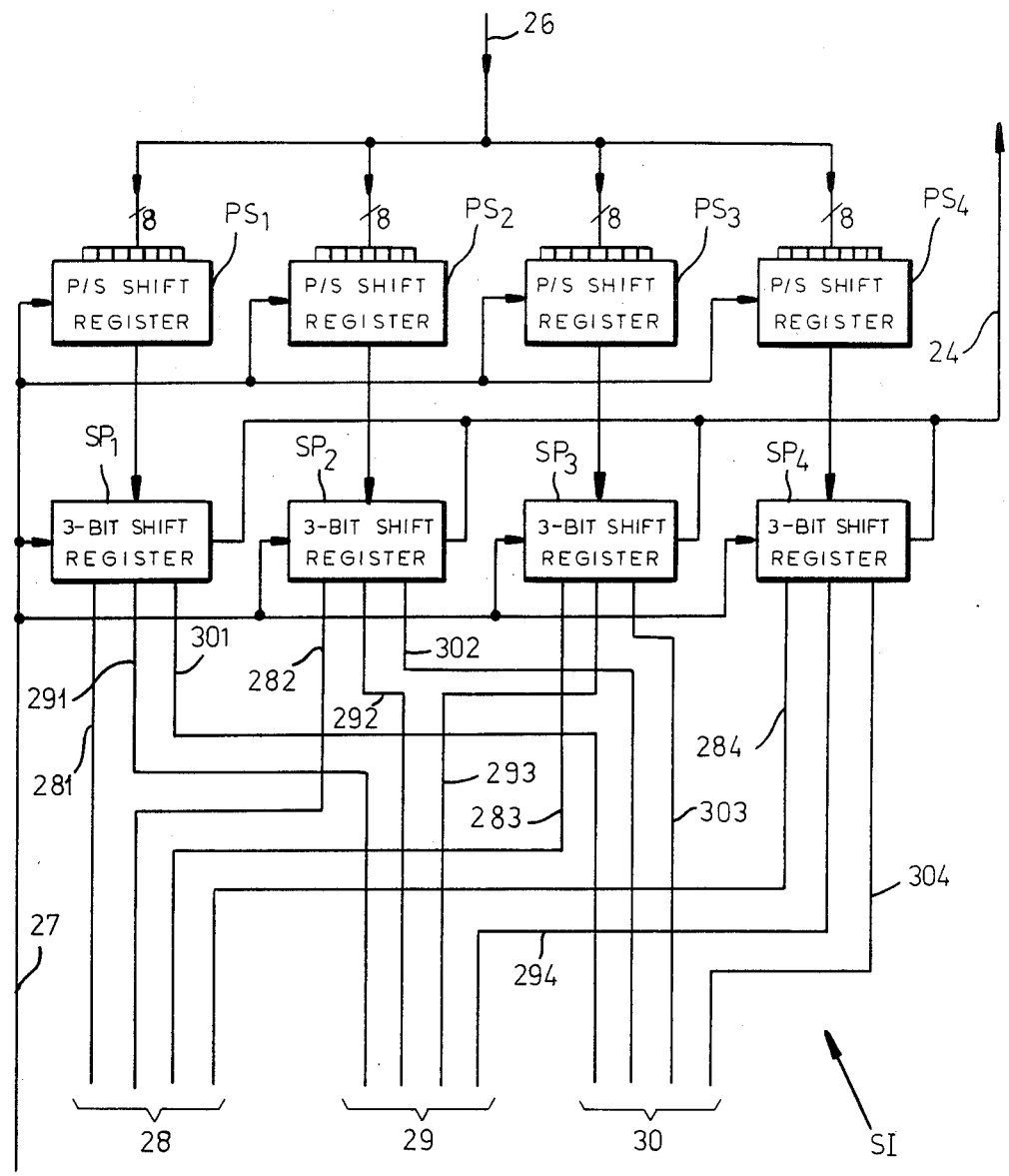
FIG. 5 is a more detailed representation of a serializer forming part of the decoder of FIG. 4.

Serializer SI, as illustrated in FIG. 5, comprises four parallel/series shift registers $PS_1$–$PS_4$ each having eight inputs connected to respective wires of multiple 26. Registers $PS_1$, $PS_2$, $PS_3$, $PS_4$ deliver the incoming bits in series to inputs of respective 3-bit shift registers $SP_1$, $SP_2$, $SP_3$, $SP_4$ of the series/parallel type having respective output leads 281, 291, 301; 282, 292, 302; 283, 293, 303; 284, 294, 304. Leads 281–284, 291–294 and 301–304 are grouped into respective multiples 28, 29 and 30 extending to a read-only memory MS of the stored-microprogram type provided with an output register $R_3$. Memory MS has an output lead 27 for carrying shifting commands to registers $PS_1$–$PS_4$ and $SP_1$–$SP_4$. A lead 31 feeds back to memory MS information on the state of loading of register $R_3$ which has an output multiple 32 extending to a FIFO memory MF with a storage capacity of 64 words; another output lead 33 of memory MS serves for the transmission of a writing request to a logic circuit LF which controls the writing and reading of memory MF through a two-way connection 34. The data-requesting lead 24 originates at registers $SP_1$–$SP_4$ and is energized whenever all of them are empty.

Upon a loading of registers $PS_1$–$PS_4$, the bits present in the No. 1, No. 9, No. 17 and No. 25 positions of multiple 32 appear on their output leads and are transferred by registers $SP_1$–$SP_4$ to their respective leads 301, 302, 303 and 304. Memory MS, upon receiving these bits on multiple 30, stores them and energizes the lead 27 to shift the registers $PS_1$–$PS_4$ and $SP_1$–$SP_4$. As a result of this shift, the aforementioned bits now appear on the leads 291–294 of multiple 29 while the leads 301–304 of multiple 30 respectively receive bits Nos. 2, 10, 18 and 26. In like manner, the next shift transfers the bits of multiple 29 to multiple 28 and those of multiple 30 to multiple 29 while bits Nos. 3, 11, 19 and 27 appear on multiple 30. Memory MS is thus able to determine, by comparing the bit combinations arriving in staggered relationship on the signal paths represented by these multiples, whether or not their order of succession is consistent with the adopted mode of operation. Thus, for example, the first three bits of a given byte—except for one representing a cycle count—may have to have a predetermined configuration (e.g. all-1) so that a comparator in memory MS would indicate an error if, after the last transfer described, corresponding wires of multiples 28–30 did not carry bits conforming to this configuration in at least three of the four instances. If no error is detected by this comparison, the first set of bits (Nos. 1, 9, 17 and 25) are entered in corresponding stages of register $R_3$ while another shift delivers bits Nos. 4, 12, 20 and 28 to multiple 30; concurrently therewith, the first set disappears from serializer SI and the two following sets are respectively transferred to multiples 28 and 29. When all 32 bits have been transferred in this manner and loaded into register $R_3$, the clearing of all the registers of serializer SI gives rise to another request signal on lead 24 even as memory MS clears its own cells.

When FIFO memory MF has at least one free cell, it sends a signal via connection 34 to logic circuit LF which delivers a transfer command via the same connection to memory MF in the presence of a writing request on lead 33. When the contents of register $R_3$ have been fully transferred to memory MF, the register energizes its output lead 31 whereupon the previous procedure is repeated with the bits of four new bytes.

Another input of circuit LF is connected to an output lead 35 of a further read-only memory MT of the stored-microprogram type which has inputs connected to wires of an output multiple 38 of a register RB. Memory MT, when ready to receive data, energizes the lead 35 whereupon logic circuit LF commands the memory MF to deliver the byte next in line via a multiple 36 to register RB. Memory MF is programmed to separate 4-bit luminance codes, identified by an integrity code in the first half of the same byte, from all other items of information and to direct the luminance bits to a section of register RB from which an output multiple 39 extends to an expansion register ES downstream of memory MT. The other items are fed by that register to memory MT, in response to a request emitted on a lead 37, and in parallel therewith to a comparator CT also having inputs connected to multiple 38. This comparator receives the locally generated sync signals on connection 21 and enables the memory MT for writing upon detecting a coincidence with a corresponding signal on multiple 38. In the absence of such coincidence, a line- or frame-synchronizing signal emitted by register RB is stored in the comparator until the arrival of its locally generated counterpart, thereby assuring the necessary correlation of the incoming data flow with the timer controlling the monitoring tube MN (FIG. 3).

Memory MT detects the reduction codes and the associated cycle counts in order to perform the necessary duplication of these codes, each of which causes the expander ES to generate an all-zero bit group. This memory also determines whether the number of cycles between successive line-synchronizing signals and the number of the latter signals between successive frame-synchronizing signals have predetermined values and, in the event of an error, instructs the expander ES to emit only all-zero luminance bits on its output line 20 to storage unit AS whereby converter DS (FIG. 3) reproduces the previous frame or frames on the monitoring viewer MN until synchronism is re-established. In the case of prolonged lack of alignment, an error pattern may be displayed.

Memory MT, which receives the locally generated clock pulses from unit AS via line 21, times the operation of expansion register ES through a connection 44. Other connections 41 and 43 enable an exchange of operating commands and the acknowledgment signals between memory MT and register ES.

It will be understood that the operations of memory MT and expander ES would have to be altered if a different mode of information reduction were adopted. For the most part, however, the encoder CL of FIG. 2 and the decoder DL of FIG. 4 can be used virtually unchanged with any of these modes.

We claim:

1. A method of conveying a sequence or original message signals from a transmitting station over a communication channel to a receiving station in the form of digital data words of reduced information content corresponding to the data-handling capacity of said channel, comprising the steps of:

(a) encoding said original message signals, at said transmitting station, into a plurality of different types of bit groups with at least partial elimination of redundancies, a first of said types, referred to as magnitude-indicating mode, representing magnitudes of a number of said message signals when said number of said message signals is not equal to corresponding message signals of a previous sequence, a second of said types being a qualitative code representing an information-reducing mode, when a number of said message signals is equal to corresponding message signals of a previous sequence thus eliminating a number of signal cycles due to redundancies in said sequence, a third of said types being a quantitative code representing a count of the number of signal cycles eliminated, a fourth of said types representing synchronization signals, a fifth of said types representing a changeover mode whereby said changeover mode indicates either a changeover from said magnitude-indication mode to said information reduction mode or a changeover from said information reduction mode to said magnitude indication mode;

(b) accumulating the bits of a predetermined number of said groups at said transmitting station;

(c) sending the accumulated bits at regular intervals over said channel to said receiving station;

(d) temporarily storing at said receiving station the bits arriving over said channel;

(e) reorienting the stored bits in groups corresponding to those of step (a) with decoding of said groups and separation of different types thereof from one another; and (f) reconstituting the sequence of original message signals, with re-expansion of the information contained in the groups of said first, second and third types, under the control of locally generated timing signals correlated with the synchronization signals represented by the groups of said fourth type.

2. A method as defined in claim 1 wherein said original message signals are luminance values of individual picture elements of a television image scanned in a multiplicity of lines of a recurrent frame, said information-reducing mode comprising a comparison of the luminance values of currently scanned picture elements with those of homologous picture elements on an immediately preceding frame and generation of bit groups of said firt type only for picture elements whose luminance values significantly differ from those of their respective homologs, a substantially unchanged luminance value and the number of consecutive occurrences thereof in a frame scan being respectively indicated by said qualitative and quantitative codes.

3. A system for conveying a sequence of original message signals from a transmitting station over a communication channel to a receiving station in the form of digital data words of reduced information content corresponding to the data-handling capacity of said channel, comprising:

coding means connected at said transmitting station to a video camera with scanning means generating said original message signals in conformity with luminance values of picture elements forming a multiplicity of lines of a recurrent frame, for at least partially eliminating redundancies by converting only some of said message signals into respective bit groups of a first type representing same in a magnitude-indicating mode, replacing redundancy-containing groupings of other message signals by single bit groups of a second type representing a qualitative code indicate of an information-reducing mode with elimination of a number of signal cycles in said sequence, generating for each bit group of said second type a bit group of a third type representing a quantitative code indicating the number of cycles eliminated, and adding a recurrent bit group of a fourth type representing synchronization signals, whereby said coding means comprising a precoding stage with storage means for retaining the luminance values of the picture elements of a previously scanned frame and comparison means for ascertaining substantial equalities between a newly scanned picture and a homologous picture element of said previously scanned frame, said coding means further comprising a message encoder connected to said precoding means for receiving therefrom bit groups of said first type for picture elements not substantially equal to their homologs and a bit group of said second type for a grouping of consecutive picture elements substantially equal to their homologs, said message coder further including memory means for reading out a bit group of said second type in response to an equality signal from said precoder and counting means for determining the number of picture elements giving rise to said equality signal and generating a bit group of said third type representing the number so determined, first storage means connected to said coding means for accumulating the bits of a predetermined number of said groups;

interface means responsive to the accumulation of said predetermined number of groups in said first storage means for serially emitting the bits thereof at regular intervals over said channel to said receiving station;

second storage means connected at said receiving station to said channel for temporarily registering the arriving bits of said groups;

decoding means connected to said second storage means for reorienting the registered bits in groups corresponding to those previously contained in said first storage means and reconstituting the sequence of original message signals with re-expansion of the information contained in the groups of said first, second and third types; and timing means at said receiving station for controlling the operation of said decoding means by locally generated clock pulses correlated with said synchronization signals.

4. A system for conveying a sequence of original message signals from a transmitting station over a communication channel to a receiving station in the form of digital data words of reduced information corresponding to the data-handling capacity of said channel, comprising:

coding means connected at said transmitting station to a video camera with scanning means generating said original message signals in conformity with luminance values of picture elements forming a multiplicity of lines of a recurrent frame, for at least partially eliminating redundancies by converting only some of said message signals into respective bit groups of a first type representing same in a magnitude-indicating mode, replacing redundancy-containing groupings of other message signals by single bit groups of a second type representing a qualitative code indicative of an information-reducing mode with elimination of a number of signal cycles in said sequence, generating for each bit group of said second type a bit group of a third type representing a quantitative code indicating the number of cycles eliminated, and adding a recurrent bit group of a fourth type repesenting synchronization signals, whereby said coding means comprising a precoding stage with storage means for retaining the luminance values of the picture elements of a previously scanned frame and comparison means for ascertaining substantial equalities between a newly scanned picture and a homologous picture element of said previously scanned frame, said coding means further comprising a message encoder connected to said precoding means for receiving therefrom bit groups of said first type for picture elements not substantially equal to their homologs and a bit group of said second type for a grouping of consecutive picture elements substantially equal to their homologs, said message coder further including memory means for reading out a bit group of said second type in response to an equality signal from said precoder and counting means for determining the number of picture elements giving rise to said equality signal and generating a bit group of said third type representing the number so determined wherein said message encoder further comprises multiplexing means with a set of first inputs connected to said precoder, to said memory means and to said counting means for receiving therefrom the bit groups of said first, second and third types, said multiplexer means being switchable by a synchronizing signal from said precoder to a second input for receiving a bit group of said fourth type in response thereto, register means connected to an output of said multiplexer means for temporarily storing said bit groups, and summing means controlled by said memory means for keeping track of the number of bit groups delivered by said multiplexer means to said register means to load said first storage means with the bit groups so stored in said register means;

first storage means connected to said coding means for accumulating the bits of a predetermined number of said groups;

interface means responsive to the accumulation of said predetermined number of groups in said first storage means for serially emitting the bits thereof at regular intervals over said channel to said receiving station;

second storage means connected at said receiving station to said channel for temporarily registering the arriving bits of said groups;

decoding means connected to said second storage means for reorienting the registered bits in groups corresponding to those previously contained in said first storage means and reconstituting the sequence of original message signals with re-expansion of the information contained in the groups of said first, second and third types; and timing means at said receiving station for controlling the operation of said decoding means by locally generated clock pulses correlated with said synchronization signals.

* * * * *